United States Patent Office 2,858,795
Patented Nov. 4, 1958

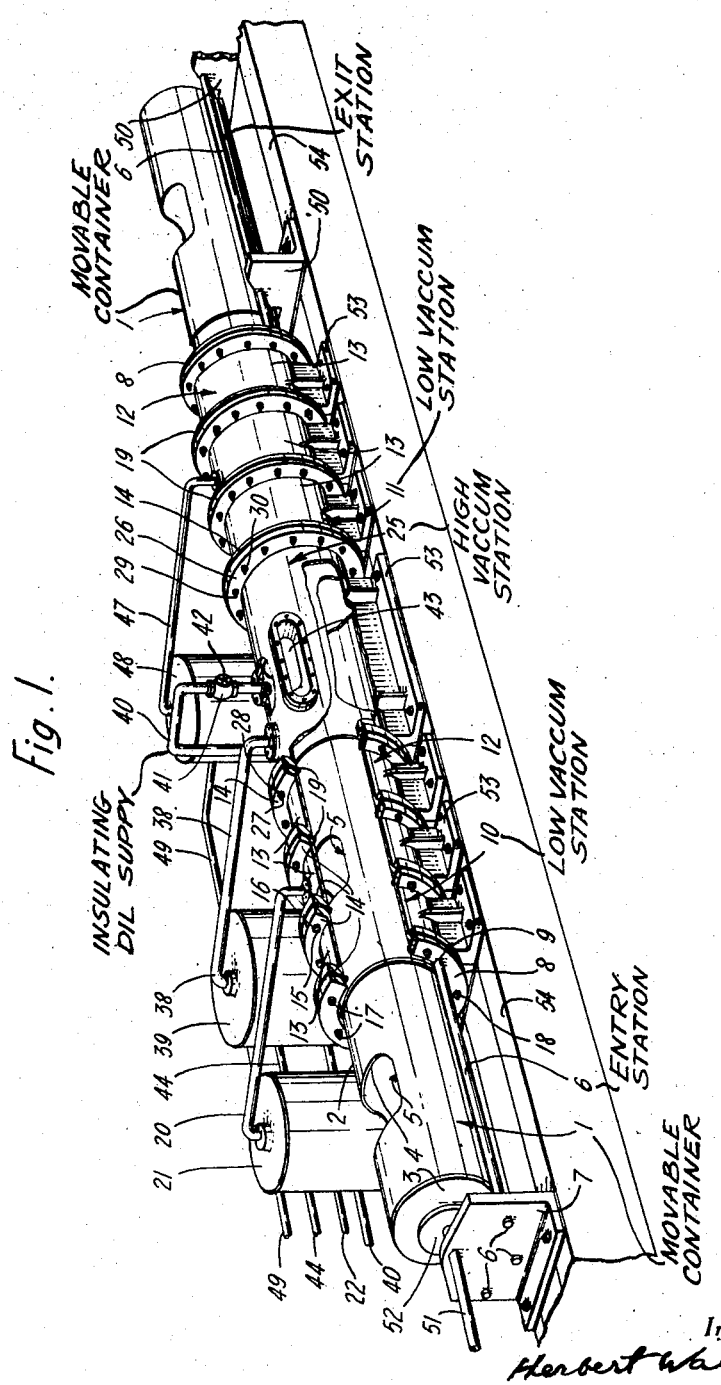

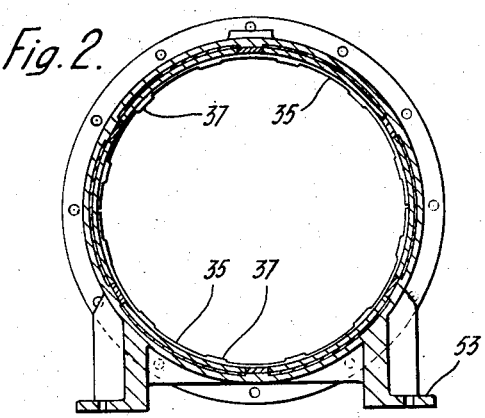
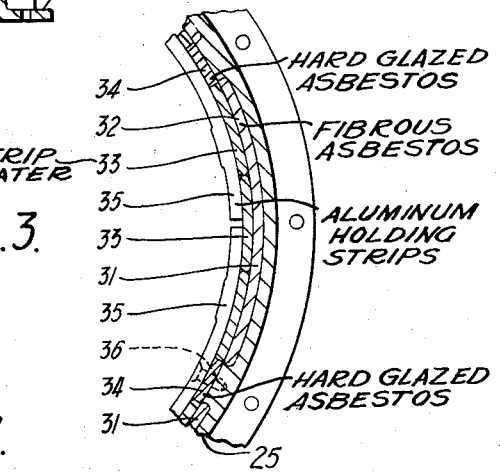
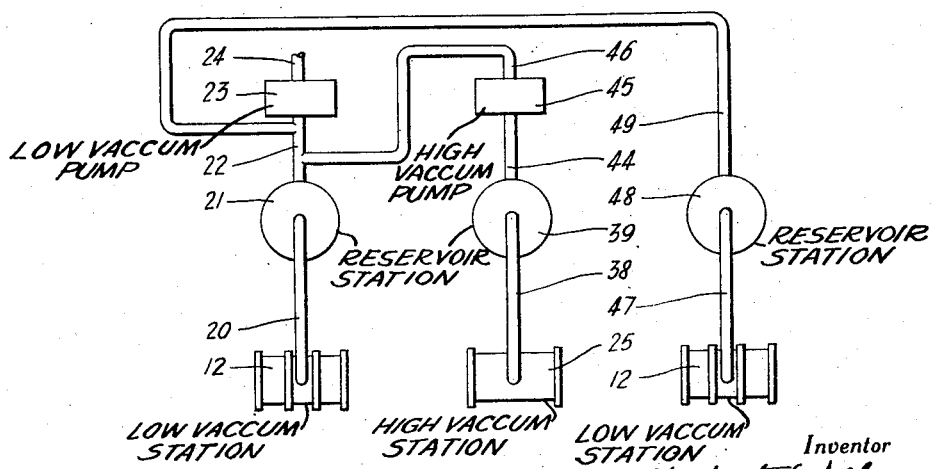

2,858,795

APPARATUS FOR DRYING AND IMPREGNATING SMALL ARTICLES

Herbert Walker, Helsby via Warrington, England, assignor to British Insulated Callender's Cables Limited, London, England, a British company Application May 18, 1955, Serial No. 509,324

Claims priority, application Great Britain May 24, 1954

8 Claims. (Cl. 118—50)

This invention is concerned with treating under vacuum large numbers of small articles to effect, for example, the drying and/or impregnating of small electrical capacitors. The treatment is carried out in a series of steps and apparatus in accordance with the invention for carrying out the treatment, comprises a tubular structure and at least three tubular containers disposed therein. Between the walls of the tubular structure and the containers are clearances which are sealed to form at least three sealed compartments. These compartments are in communication with the interiors of the containers therein and means are provided for maintaining a vacuum in a central compartment and a lower vacuum in other compartments and the apparatus also has means for inserting additional containers, one at a time, into one end of the tubular structure to displace the containers therein and to discharge one of the containers from the other end of the structure.

The sealed compartments provide stations for the containers so that within the tubular structure there are at least three stations. There may be, for example, one central station and one station disposed on each side of the central station, the latter being, for example, maintained under a high vacuum and each of the other stations, under a low vacuum. A convenient arrangement is one where the sealed compartments or stations for the tubular containers are of the same length as one another and each container has a length equal to that of a station. The length of each station may be, however, a multiple of the length of a container.

The containers are placed end to end and are moved simultaneously through the tubular structure, for example, by a ram mounted at one end of the structure. Other means, however, may be employed for effecting the movement of the containers from station to station. One or more of the stations may be provided with heating means.

In addition to the three or more stations provided within the tubular structure, there may be a station at one end of the structure for the reception of a container which is subsequently moved into the adjacent end of the structure. There may also be a station at the opposite end of the structure to receive a container discharged from that end of the structure.

The invention will be described further with the aid of the accompanying drawings which illustrate one form of construction by way of example and wherein:

Figure 1 is a perspective view with some parts shown broken away,

Figure 2 is an end sectional elevation,

Figure 3 is a fragmentary end sectional elevation drawn to an enlarged scale and Figure 4 is a purely diagrammatic view.

The apparatus illustrated is suitable for the drying and impregnation of electric capacitors of the wound type, the drying being carried out with the aid of a vacuum and heat and the impregnating medium being an insulating oil. The apparatus will be described as being applied to such treatments of electric capacitors. The capacitors (not shown) to be treated are loaded into a container indicated generally by the reference numeral 1 and the container is then advanced in a straight line from its first position into four other positions, the advancement being effected at appropriate intervals. In passing through the apparatus, the container thus occupies five positions which are hereinafter referred to as stations, the first station being referred to as the entry station and the last station, as the exit station. Immediately following the entry station is a low vacuum station where the contents of the container 1 are subjected to a low vacuum. The container passes from the low vacuum station to a high vacuum station, where the capacitors are subjected to a high vacuum and to heat and are also impregnated and from the high vacuum station, the container is moved into a low vacuum station and from thence to an exit station. At the latter the container is removed from the apparatus.

Referring to Figure 1, the container 1 shown at the left-hand end is in the entry station and after being filled to an appropriate level with capacitors to be treated is ready for advancement into the first low vacuum station. When the apparatus is in use, a container will be located at each of the five stations, removal of a container from the exit station being followed by the placing of a container in the entry station.

Each container 1 consists of a cylindrical tube 2 closed at its ends by end plates 3 and having in its upper part a filling aperture 4 disposed midway of the length of the tube and occupying about a third of that length. The aperture 4 has a lower edge 5 which is kept as high as is practicable so as to obtain the maximum volume within the container for occupation by the capacitors, having regard to the provision of access to the interior of the container and the necessity for the immersion subsequently of the capacitors in insulating oil during the impregnation.

The entry station of the apparatus is provided by three cylindrical rods 6 each of which is supported at one end by a bracket 7 and at the other end by a ring 8. The three rods, bracket and ring together form an open framework for the support of a container, the latter being disposed between the bracket 7 and the ring 8 and being supported on its underside by the rods 6 with the aperture 4 disposed uppermost. The open framework arrangement of the entry station enables an empty or a filled container 1 to be placed at that station without difficulty, ready for its advance from that station to the immediately adjacent low vacuum station. As will be seen from Figure 1, the rods 6 extend through holes in the bracket 7 and are located in notches 9 in the ring 8. If empty the container will be filled, of course, before entering the low vacuum station.

The two low vacuum stations are of identical construction so that a description of one will suffice. These two stations are indicated generally in Figure 1 by the reference numerals 10 and 11 respectively. The low vacuum station 10 which is disposed immediately in advance of the entry station, will now be described. This station comprises a tubular member indicated generally by the reference numeral 12 and composed of three sections 13 of equal length and of identical construction and coaxially arranged. Each section consists of a cylindrical tube having at each end a circular flange 14 and the three sections are held together by bolts 15 passing through adjacent flanges 14 and by nuts 16 on the bolts, the ring 8 being secured to the adjacent flange 14 by bolts 17 and nuts 18.

Between each pair of adjacent flanges is a packing ring 19 which is made of rubber or rubber-like material. This is preferably an oil-resisting material such as that known as neoprene, for example. The internal diameter of the tubular member 12 is slightly larger in diameter than the container 1 but the packing rings 19 project inwards beyond the internal surface of the tubular member 12 and each of such rings has an internal diameter somewhat less than the external diameter of a container 1 so that close contact is provided between the packing rings and a container as the latter is advanced from the entry station into the low vacuum station 10 and while it is in that station and as it is advanced from that station into the next station which is a high vacuum station.

One end of a pipe 20 is connected in an air-tight manner to the central section of the tubular member 12, the other end of the pipe being connected in an air-tight manner to a reservoir cylinder 21. When one of the containers 1 is at the low vacuum station, the aperture 4 in that container is disposed opposite to that end of the pipe 20 which is connected to the central section of the tubular member 12. The reservoir cylinder 21 is connected by a pipe 22 to a low vacuum pump 23 exhausting to atmosphere through a pipe 24. These connections are shown diagrammatically in Figure 4. When a container 1 is at the low vacuum station 10, the vacuum pump 23 removes most of the air and moisture from the container and the capacitors therein.

From the low vacuum station provided by the tubular member 12 and its connections, a container 1 at that station is advanced into a high vacuum station where the drying of the capacitors is completed with the aid of a high vacuum and heat and impregnation of the capacitors with insulating oil is effected.

The high vacuum station comprises a single cylindrical tube 25 having at each end a flange 26, one end flange being secured to the adjacent end flange 14 of the tubular member 12 by bolts 27 and nuts 28 and the other end flange 26 being secured to the adjacent flange 14 of the second low vacuum station by bolts 29 and nuts 30, packing rings 19 being interposed between each flange 14 and its adjacent flange.

Referring to Figures 2 and 3 and more particularly to Figure 3, the cylindrical tube 25 is formed in its inner surface with a series of spaced recesses 31 in each of which is housed a layer 32 of fibrous asbestos against which are arranged a series of metal strip heaters 33 arranged in groups, the groups being spaced by strips 34 of hard glazed asbestos. The asbestos layers 32, heaters 33 and strips 34 are held in place by a pair of semi-circular metal strips 35, made for example, of aluminium alloy and held in place by screws 36 passing through the strips 35 and 34 and screwing into the wall of the cylindrical tube 25. The strips 35 transmit the heat from the heaters 33 to the interior of the cylindrical tube 25. The metal strips 35 are provided with a series of inwardly extending circumferentially spaced projections 37 which provide guide surfaces for a container 1 as it passes through the cylindrical tube 25 and while it is in that tube.

One end of a pipe 38 is connected to the cylindrical tube 25 in an air-tight manner and the other end of the pipe is connected to a reservoir cylinder 39. The connection between the pipe 38 and the cylindrical tube 25 lies close to that end of the tube which is adjacent the tubular member 12. A pipe 40 for the supply of insulating oil is connected to the cylindrical tube 25 midway of its length, oil flowing through the pipe entering a container 1, when in the high vacuum station, through the aperture 4. The pipe 40 is provided with a valve 41 having an operating handle 42 to control the flow of the insulating oil into a container. At the side of the cylindrical tube 25 there is a window 43 through which the level of the insulating oil in a container 1 can be observed.

To the reservoir cylinder 39 is connected one end of a pipe 44 (see Figure 4), the other end of the pipe being connected to a high vacuum pump 45, having an exhaust pipe 46 connected to the pipe 22, the latter connecting the reservoir cylinder 21 and the low vacuum pump 23.

As explained above, after the completion of the impregnation of the capacitors, the container 1 at the high vacuum station is advanced therefrom into the second low vacuum station 11 which is constructed in a manner similar to the first low vacuum station, the low vacuum station 11 comprising a tubular member 12 composed of three flanged sections 13 bolted together with packing rings 19 interposed between adjacent flanges and projecting inwardly to make contact with the exterior surface of a container 1 disposed at that station, a ring 8 being used at the exit end of the station 11. To the central one of the three sections 13 is connected one end of a pipe 47, the other end of the pipe being connected to a reservoir cylinder 48. From Figure 4, it will be seen that a pipe 49 is connected at one end to the reservoir cylinder 48 and at its other end to the pipe 22 connecting the low vacuum pump 23 to the reservoir cylinder 21.

From the second low vacuum station 11, a container 1 thereat is advanced to the exit station, from which the container is removed. The exit station is shown at the right hand end of Figure 1 and consists of an open framework of essentially the same construction as that of the entry station, the exit station being provided by three horizontally disposed cylindrical rods 6 supporting a container 1 on its underside, supported by brackets 50 and the adjacent ring 8.

When the apparatus is in operation, the entry and exit stations each will be alternately occupied by a container and then left unoccupied. Thus if it be assumed that the exit station is unoccupied, the remaining four stations will each be occupied by a container filled with capacitors. All four containers are then moved forward simultaneously, the entry station then becoming unoccupied and the exit station occupied by a container. The latter will then be removed and another container placed at the entry station and the four containers then again simultaneously advanced by the length of one station.

The two tubular members 12 and the cylindrical tube 25 are of equal length. This length is approximately the same as the length of a tubular container 1, all the containers being of equal length. If it be assumed that there is a container 1 in each of the tubular members 12 and in the cylindrical tube 25 and that all the containers are stationary, the packing rings 19 disposed adjacent the ends of the tubular members 12 co-operate with the adjacent parts of the containers 1 therein to form three sealed compartments of equal length and each of approximately the same length as that of a container. The centrally disposed sealed compartment is under a high vacuum and is sealed off from the compartments on each side of it by the packing rings 19 mounted adjacent the inner ends of the tubular members 12. The two outer sealed compartments are sealed off from the atmosphere by the packing rings 19 placed adjacent the outer ends of the tubular members 12. When the containers 1 are stationary in the tubular structure, entry of air at the ends of the structure is thus prevented or reduced to a minimum and the three compartments are effectively sealed off from one another so that high vacuum conditions may exist in the central compartment and low vacuum conditions, in the two outer compartments. The intermediate packing rings 19 placed adjacent the apertures 4 in the containers 1 assist in the provision of a vacuum within the containers when stationary in the tubular members 12.

When the containers are moving, an aperture 4 in a container 1 will pass under a packing ring 19 and during that time, that packing ring will become temporarily ineffective as a sealing member. There will be, however, an adjacent packing ring 19 remaining effective as a sealing member until the first sealing member again becomes effective. Thus if a container within the tubular member 12 adjacent the entry station is moving out of that member into the cylindrical tube 25, the intermediate packing ring 19 adjacent the filling aperture in that container in the direction of movement of the container, becomes ineffective as a sealing member while the filling aperture is passing it but during that time, the other intermediate packing ring and the outermost packing ring remain effective as sealing members. By using containers with filling apertures which do not exceed in length the distance between two adjacent packing rings, it is thus possible to ensure that the reservoir cylinders are never directly open to the atmosphere so that a vacuum is more readily maintained with the avoidance of large fluctuations of pressure. When a tubular container 1 is passing from the first tubular member 12 into the cylindrical tube 25, the packing ring 19 at the inner end of that tubular member becomes temporarily ineffective as a sealing member as the filling aperture passes the packing ring but the two adjacent packing rings remain effective as sealing members. These sealing effects are obtained as a container moves from one station to the next through the apparatus.

The advancement of the containers through the apparatus is effected by a ram having a ram rod 51 passing through a hole in the bracket 7. The ram rod has a disc-shaped head 52 which can be brought to bear against the adjacent end plate 3 of a container 1 in the entry station. The stroke of the ram rod is equal to the length of a container and the length of the latter is substantially equal to the length of each station. When the ram rod 51 has been retracted, a container is placed at the entry station and the ram rod moved forward to push the containers from one station to the next. The ram rod may be operated in any convenient manner.

The two tubular members 12 and the cylindrical tube 25 are provided with brackets 53 which are bolted to a support 54 of any convenient construction. The bracket 7 and the two brackets 50 are also bolted to the support 54.

Instead of using a ram to push the containers 1 through the apparatus other means may be used for the propulsion of the tubular containers or instead of propelling the containers, they could be coupled together and drawn through the apparatus from the exit end thereof.

Although in the form of construction described, the tubular structure is provided with packing rings which project inwards and make contact with the outer surfaces of the tubular containers, the latter could be provided with sealing members which project outwardly and make contact with the walls of the tubular structure.

The length of a sealed compartment or station need not necessarily be equal to the length of a container but could be a multiple of that length so as to prolong the time a container remains at a station. There may be more than one central sealed compartment and more than one outer sealed compartment, or in other words, the tubular structure, containers therein and the sealing members may co-operate to provide more than one central station and more than one outer station for the containers.

By using vacua of different values, vacua of lower values being used at one or more outer stations than at a central station, a grading effect of vacuum is produced and this may be such that the pressure difference upon opposite sides of a sealing member is relatively small so that the tendency for leakage to take place past the sealing member is correspondingly small. The value of the vacuum at any particular station is determined primarily by the operation of the vacuum pump connected thereto. The pumps may be arranged to work independently and each station have its own vacuum pump connected thereto. There may be more than one intermediate value of vacuum between a central and an outer station. The reservoirs between the stations and the pumps serve to minimise fluctuations should there be temporary leakages when containers move between stations.

If the stations have a length which is a multiple of the length of a container, the packing rings or other sealing members should be so disposed as to prevent unnecessary ingress of air to the parts of the apparatus under vacuum.

When starting up the apparatus empty containers are inserted at the stations within the tubular structure for the purpose of securing the required conditions of vacuum within the apparatus.

It will be seen that the apparatus provides for the movement of a container filled with electric capacitors into a low vacuum station for the removal of a large part of the air and moisture and for the movement from that station into a high vacuum station to complete the drying process, with the aid of heat and a high vacuum, and for the impregnating of the capacitors, while being maintained under the high vacuum, with an insulating oil, the impregnated capacitors then being maintained under a low vacuum at another station to provide for an extended length of stay of the container under vacuum, after being filled with oil, to complete the impregnation, the container being finally discharged. The second vacuum station prevents substantial leakage into the high vacuum station from the exit end.

Although the invention has been developed in connection with the treatment of electric capacitors, it may be used for the vacuum treatment of other small articles which may or may not be electrical.

What I claim as my invention is:

1. Apparatus for the treatment under vacuum of a large number of small articles, comprising a tubular structure, at least three tubular containers for the articles, within the structure, there being clearances between the containers and the walls of the structure, means for sealing the clearances to provide at least three sealed compartments each being in communication with the interior of a container in that compartment, means for maintaining a vacuum in a central sealed compartment, means for maintaining a lower vacuum in other compartments and means for inserting additional containers, one at a time, into one end of the tubular structure to displace the containers therein and to discharge one of the containers from the other end of the structure.

2. Apparatus for the treatment under vacuum of a large number of small articles, comprising a tubular structure and at least three tubular containers for the articles in the structure, there being clearances between the containers and the walls of the structure, means sealing the said clearances to form at least three sealed compartments each in communication with the interior of a container in that compartment, means for placing a central compartment under a vacuum and other compartments under a lower vacuum, means for heating a central compartment and for admitting a liquid to a container in that compartment and means for inserting additional containers, one at a time, into one end of the tubular structure to displace the containers therein and to discharge a container from the opposite end of the structure.

3. Apparatus for the treatment of articles under vacuum, comprising a tubular structure and at least three tubular containers therein, there being clearances between the containers and the structure, sealing members carried by the tubular structure extending inwards therefrom towards and making contact with the containers to form at least three sealed compartments each communicating with the interior of a container in that compartment, means for placing a central compartment under vacuum and other compartments under a lower vacuum, a heater mounted adjacent an inner wall of a central compartment, a spacing member interposed between the heater and a container in that comartment providing a bearing surface for axial sliding of a container and means for inserting additional containers, one at a time, into one end of the structure to displace the containers therein and discharge one of the containers from the opposite end of the structure.

4. Apparatus for the treatment of articles under vacuum, comprising at least one central tubular member and at least one outer tubular member on each side of a central tubular member, the tubular members being placed end to end and being secured together to form a unitary tubular structure, a tubular container for the articles in each tubular member, annular seals between the containers in the outer tubular members and those tubular members forming at least three sealed compartments each communicating with the interior of a container in that compartment, means for placing under vacuum a container in a central tubular member and for placing containers in the outer tubular members under a lower vacuum and means for inserting additional containers, one at a time, into an outer tubular member disposed on one side of a central tubular member and for moving the containers within the tubular members through those members and for discharging a container from the end of an outer tubular member mounted on the other side of the central tubular member.

5. Apparatus for treating articles under vacuum, comprising at least one central tubular member and at least one outer tubular member on each side of a central tubular member, the tubular members being placed end to end and being of approximately the same internal diameter and being secured together to form a unitary tubular structure, a tubular container having a filling aperture, in each tubular member, annular seals between the containers in the outer tubular members and those tubular members forming at least three sealed compartments each communicating with the interior of a tubular container, some of those seals being disposed adjacent the ends of the outer tubular members and other annular seals being disposed adjacent opposite ends of the filling aperture of a container in an outer tubular member, means for placing a container in a central tubular member under a vacuum and for placing containers in the outer tubular members under a lower vacuum and means for inserting additional containers, one at a time, into an outer tubular member on one side of a central tubular member to move all the containers in the apparatus and to discharge a container from the end of an outer tubular member placed on the other side of the central tubular member.

6. Apparatus for treating articles under vacuum, comprising a tubular structure and at least three tubular containers therein, there being clearances between the containers and the walls of the tubular structure, means sealing the said clearances to provide a central portion of the structure which is sealed off from adjacent portions thereof the said central and adjacent portions being each in communication with a container, such portions being of substantially equal length and having a length approximating to that of a container, means for independently placing a central portion and at least one adjacent portion under vacuum and means for inserting additional containers, one at a time, into one end of the structure and for advancing the containers within the structure in steps through a distance approximating to the length of a container and for discharging a container at the opposite end of the structure.

7. Apparatus for treating articles under vacuum, comprising a tubular structure and at least three containers within the structure, there being clearances between the containers and the walls of the structure, means sealing the said clearances forming at least one central sealed compartment and at least two other compartments, each in communication with the interior of a container within the compartment, means for independently placing a central compartment and at least one other compartment under vacuum, means for pushing a container into one end of the tubular structure to displace the containers therein and eject a container at the opposite end of the structure.

8. Apparatus for treating articles under vacuum, comprising at least one central tubular member and at least one outer tubular member on each side of a central tubular member, the tubular members having approximately the same internal diameter and being placed end to end and secured together to form a unitary structure and each outer tubular member being built up of a number of sections, a sealing ring being disposed between adjacent sections and also adjacent the ends of the outer tubular members, a tubular container in each tubular member, the sealing rings bridging clearances between the tubular members and the containers therein and at least some of the sealing rings cooperating with at least some of the containers to form at least three sealed compartments each in communication with the interior of a container, means for placing a container in a central tubular member under a vacuum and for placing containers in the outer tubular members under a lower vacuum, and means for inserting additional containers one at a time, into one end of an outer tubular member to displace the containers in the tubular members and to discharge a container from the end of an outer tubular member placed on the other side of a central tubular member.

References Cited in the file of this patent
UNITED STATES PATENTS

| | | |
|---|---|---|
| 1,470,919 | Haas | Oct. 16, 1923 |
| 1,760,583 | Clark | May 27, 1930 |
| 1,785,037 | Martell | Dec. 16, 1930 |
| 2,120,816 | Schnoll | June 14, 1938 |
| 2,124,162 | Eddison | July 19, 1938 |